(12) United States Patent
Omata

(10) Patent No.: US 7,281,432 B2
(45) Date of Patent: Oct. 16, 2007

(54) DISPLACEMENT SENSOR WITH AN EXCITATION COIL AND A DETECTION COIL

(75) Inventor: Sadao Omata, Tokyo (JP)

(73) Assignee: Nihon University, Tokyo (JP)

( * ) Notice: Subject to any disclaimer, the term of this patent is extended or adjusted under 35 U.S.C. 154(b) by 117 days.

(21) Appl. No.: 11/178,564

(22) Filed: Jul. 12, 2005

(65) Prior Publication Data

US 2005/0247134 A1 Nov. 10, 2005

Related U.S. Application Data

(62) Division of application No. 10/476,304, filed as application No. PCT/JP02/03884 on Apr. 18, 2002, now Pat. No. 7,007,554.

(30) Foreign Application Priority Data

Oct. 30, 2001 (JP) ............................. 2001-333299

(51) Int. Cl.
 *G01B 7/00* (2006.01)
(52) U.S. Cl. ..................... 73/800; 73/1.79; 324/207.12
(58) Field of Classification Search ................. 73/1.79, 73/800; 324/207.11, 207.15, 207.16, 228.234
See application file for complete search history.

(56) References Cited

U.S. PATENT DOCUMENTS

| | | | |
|---|---|---|---|
| 3,891,918 A * | 6/1975 | Ellis | 324/207.16 |
| 4,241,995 A | 12/1980 | Takahama | |
| 4,339,739 A * | 7/1982 | Dron | 336/136 |
| 4,634,126 A * | 1/1987 | Kimura | 273/129 S |
| 4,914,610 A * | 4/1990 | Shimizu et al. | 702/97 |
| 5,107,210 A * | 4/1992 | Shirao et al. | 324/207.12 |
| 5,206,587 A * | 4/1993 | Rose | 324/207.16 |
| 5,392,121 A | 2/1995 | Hosaka et al. | |
| 5,394,233 A | 2/1995 | Wang | |

(Continued)

FOREIGN PATENT DOCUMENTS

JP 62-276402 12/1987

(Continued)

*Primary Examiner*—Edward Lefkowitz
*Assistant Examiner*—Freddie Kirkland, III
(74) *Attorney, Agent, or Firm*—Oblon, Spivak, McClelland, Maier & Neustadt, P.C.

(57) ABSTRACT

To be able to detect a displacement amount of a moving object by a resolution of from micrometer to nanometer by a simple structure.

An excitation coil 23 and a detection coil 25 are arranged to align and a magnetic body probe 27 in a conical shape a sectional area of which is change in a longitudinal direction is arranged in a state of being inserted into an air core portion of the excitation coil 23. An output terminal from the detection coil 25 is connected to an amplifier 33 and a phase shifting circuit 35 is provided between the amplifier 33 and an input terminal of the excitation coil 23. When the probe 27 of the magnetic body is moved at inside of the air core portion of the excitation coil 23, inductance of the excitation coil 23 is changed, a phase difference is produced between an input signal inputted to the excitation coil 23 and an output signal outputted from the detection coil 25 and the phase shifting circuit 35 changes a frequency to nullify the phase difference. The displacement amount is detected from the frequency deviation at this occasion.

2 Claims, 5 Drawing Sheets

U.S. PATENT DOCUMENTS

| | | | |
|---|---|---|---|
| 5,652,510 A * | 7/1997 | Kyodo | 324/207.16 |
| 5,766,137 A * | 6/1998 | Omata | 600/587 |
| 5,767,670 A * | 6/1998 | Maher et al. | 324/207.12 |
| 5,777,468 A * | 7/1998 | Maher | 324/207.18 |
| 6,476,605 B1 * | 11/2002 | de Coulon | 324/243 |
| 6,583,618 B2 * | 6/2003 | McClelland | 324/239 |
| 6,642,710 B2 * | 11/2003 | Morrison et al. | 324/207.12 |
| 6,967,574 B1 * | 11/2005 | Nelson | 340/551 |
| 7,007,554 B2 * | 3/2006 | Omata | 73/800 |
| 7,038,443 B2 * | 5/2006 | Proksch et al. | 324/207.18 |
| 7,078,906 B2 * | 7/2006 | Nelson | 324/327 |

FOREIGN PATENT DOCUMENTS

| | | |
|---|---|---|
| JP | 99312/1990 | 8/1990 |
| JP | 9-145691 | 6/1997 |
| WO | 99/13293 | 3/1999 |

* cited by examiner

DISPLACEMENT SENSOR WITH AN EXCITATION COIL AND A DETECTION COIL

CROSS-REFERENCE TO RELATED APPLICATIONS

The present application is a divisional of U.S. application Ser. No. 10/476,304 filed on Oct. 29, 2003 now U.S. Pat. No. 7,007,554, the entire contents of which are hereby incorporated herein by reference, and in turn claims priority to JP 2001-333299 filed on Oct. 30, 2001.

TECHNICAL FIELD

The present invention relates to a displacement sensor.

BACKGROUND ART

In order to control operation of a microactuator of a manipulator or the like used in a micromachine or gene manipulation, it is requested that the microactuator is small-sized and light-weighed for detecting and measuring a displacement amount of a moving object by a resolution of from micrometer to nanometer. Conventionally, in detecting and measuring a displacement amount by the resolution of from micrometer to nanometer, various systems have been proposed and reduced into practice. Representatively, there can be pointed out laser measurement by a method of irradiating an object with laser light and detecting a phase difference brought about in accordance with displacement of the object, a method of using a phenomenon of interference between the laser light and reference light or the like.

A displacement amount in a nanometer order can be measured by using laser measurement technology or the like. However, whereas a size of a microactuator is in an order of from several centimeters to ten and several centimeters, in the laser measurement, a light source, a measuring portion for detecting and measuring a phase difference or interference and the like become considerably large-sized. Further, the apparatus becomes expensive since a complicated optical system and a measuring frequency at a high frequency are used and the like in order to promote the resolution.

DISCLOSURE OF THE INVENTION

It is an object of the invention to resolve the problem of the conventional technology and to provide a displacement sensor for detecting and measuring a displacement amount of a moving object by a resolution of from micrometer to nanometer by a simple structure and suitable for small-sized and light-weighted formation.

In order to achieve the above-described above, a displacement sensor according to the invention is characterized in comprising an excitation coil and a detection coil arranged in a predetermined positional relationship, an amplifier an input end of which is connected to an output end of the detection coil, a phase shifting circuit provided between an output end of the amplifier and an input end of the excitation coil for shifting to nullify a phase difference by changing a frequency when the phase difference is produced between an input waveform inputted to the excitation coil and an output waveform outputted from the detection coil, frequency measuring means for detecting a frequency deviation produced by shifting the phase, and a rod-like probe of a magnetic body which is inserted into at least one of air core portions of the excitation coil and the detection coil and a sectional area of which is changed in a longitudinal direction for detecting a displacement amount of an object to be measured from the frequency deviation produced by displacing the rod-like probe in the longitudinal axis direction while maintaining a resonating state of a closed loop including a space between the excitation coil and the detection coil.

Further, the displacement sensor according to the invention is characterized in that the excitation coil is constituted by connecting two coils wound such that polarities thereof are directed reverse to each other in series.

Further, a displacement sensor according to the invention is characterized in comprising a light emitting element for making light incident on an object to be measured, a light receiving element for detecting a reflected wave from the object to be measured, an amplifier an input end of which is connected to an output end of the light receiving element, a phase shifting circuit provided between an output end of the amplifier and an input end of the light emitting element for shifting to nullify a phase difference by changing a frequency when the phase difference is produced between an input waveform inputted to the light emitting element and an output waveform outputted from the light receiving element, and frequency measuring means for detecting a frequency deviation produced by shifting the phase for detecting a displacement of the object to be measured from the frequency deviation produced by displacing the object to be measured while maintaining a resonance of a closed loop including a space between the light emitting element and the light receiving element.

The displacement sensor according to the invention is constructed by a constitution in which a detection coil, an amplifier, a phase shifting circuit and an excitation coil are connected in this order and a rod-like probe of a magnetic body a sectional area of which is changed in a longitudinal axis direction is arranged to be inserted into at least one of air core portions of the detection coil and the excitation coil. According to the constitution, when the rod-like probe is displaced in the longitudinal axis direction, a frequency deviation is produced in accordance with a displacement amount while maintaining a resonating state of a closed loop including a space between the excitation coil and the detection coil and therefore, the displacement amount of the rod-like probe can be detected. Since a frequency deviation of several kHz is produced by a displacement amount of 1 mm, there can be realized a displacement sensor capable of detecting the displacement amount by a resolution of 0.1 through 0.01 micrometer, detecting and measuring a displacement amount of a moving object by a resolution in a micrometer to nanometer order by a simple structure and suitable for small-sized and light-weighted formation.

Further, the excitation coil is constituted by connecting two coils wound such that polarities thereof are directed reverse to each other in series. In this case, magnetic fields thereof are canceled by each other at a vicinity of a point of connecting the two coils and when the two coils are provided with the same characteristic, a substantially nullified magnetic field is constituted to balance. By constructing a constitution of arranging a probe of a magnetic body to be inserted into an air core portion thereof, a sensitivity with respect to the displacement is increased, a frequency deviation equal to or larger than 10 kHz is produced by a displacement amount of 1 mm and therefore, there can be realized a displacement sensor for detecting and measuring the displacement amount of the moving object by a resolution at a micrometer level by a simple structure and suitable for small-sized and light-weighted formation.

Further, a displacement sensor according to the invention is constructed by a constitution in which a light emitting element and a light receiving element are used, light is made to be incident on an object to be measured, a reflected wave therefrom is detected and the light receiving element, an amplifier, a phase shifting circuit and the light emitting element are connected in this order. According to the constitution, when the object to be measured is displaced, a frequency deviation is produced in accordance with the displacement amount while maintaining a resonating state of a closed loop including a space between the light emitting element and the light receiving element and therefore, the displacement amount of the object to be measured can be detected. Since a frequency deviation equal to or larger than 10 kHz is produced by a displacement amount of 1 mm, there can be realized a displacement sensor for detecting and measuring the displacement amount of the moving object by a resolution in a micrometer through nanometer order by a simple structure and suitable for small-sized and light-weighted formation.

BEST MODE FOR CARRYING OUT THE INVENTION

Figure 1:
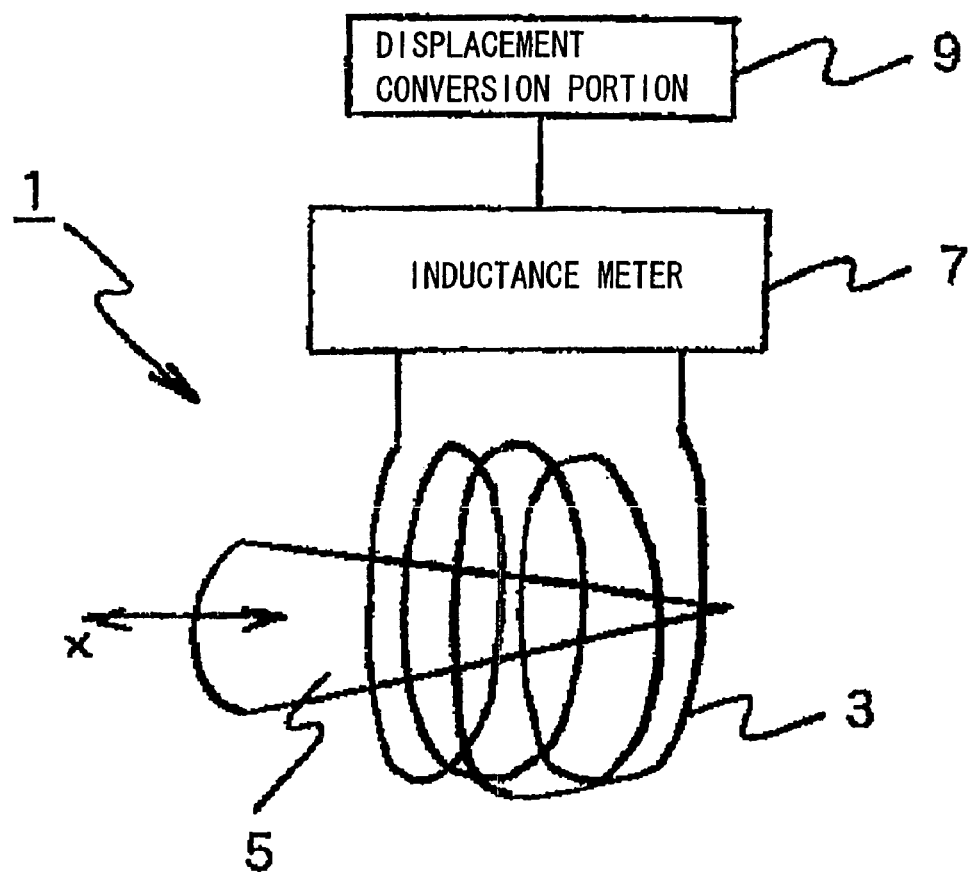
FIG. 1 is a view showing a constitution of a displacement sensor of an inductance directly measuring type according to a first embodiment of the invention.

A detailed explanation will be given of embodiments of the invention in reference to the drawings as follows. FIG. 1 is a view showing a constitution of a displacement sensor 1 of an inductance directly measuring type according to a first embodiment. The displacement sensor 1 is constituted by a coil 3, a probe 5 of a magnetic body in a conical shape a sectional area of which is changed in a longitudinal axis direction, an inductance meter 7 arranged between two terminals of the coil 3 and a displacement conversion portion 9 for converting a detected value of the inductance meter 7 into a displacement amount. The probe 5 of the magnetic body is arranged to be inserted into an air core portion of the coil 3.

According to the constitution, when the probe 5 of the magnetic body is displaced at inside of the air core portion of the coil 3 in a longitudinal axis direction (x), inductance of the coil 3 is changed. That is, it is generally known that inductance of a coil having a permeability $\mu$ of an air core portion, a sectional area A, a length L in a longitudinal direction and a turn number N is proportional to $\mu*A*N*N/L$. Hence, when the probe 5 of the magnetic body the sectional area of which is changed in the longitudinal direction is displaced in the longitudinal direction (x) at inside of the air core portion of the coil 3, in accordance with a displacement amount thereof, a volume of the probe disposed in the air core portion of the coil 3 is changed, $\mu$ is substantially changed and the inductance is changed.

Figure 2:
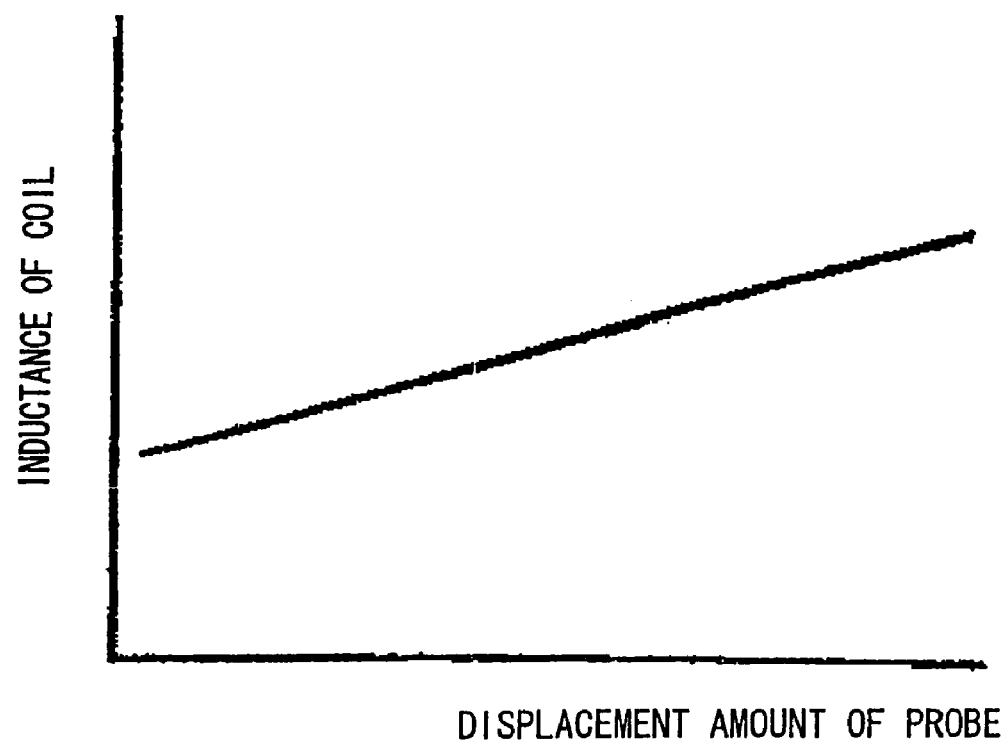
FIG. 2 is a diagram designating the abscissa by a displacement amount of a probe and designating the ordinate by inductance of a coil and showing a relationship therebetween according to the first embodiment of the invention.

FIG. 2 is a diagram designating the abscissa by the displacement amount of the probe 5 and designating the ordinate by the inductance of the coil 3 and showing a relationship therebetween. Now, it is assumed that a direction of increasing the displacement amount is a direction of increasing the volume of the probe 5 of the magnetic body disposed at the air core portion of the coil 3. In this case, with an increase in the displacement amount, $\mu$ is substantially increased and the inductance of the coil 3 is also increased. When a rate of changing the sectional area of the probe 5 in the longitudinal direction is pertinently designed, a change in the displacement amount and a change in the inductance can be made to be linear.

In this way, the displacement amount of the probe 5 can be provided by a simple structure by displacing the probe 5 of the magnetic body the sectional area of which is changed in the longitudinal direction at inside of the area core portion, detecting the change in the inductance of the coil 3 at that occasion by the inductance meter 7 and converting a detected value thereof into the displacement amount by the displacement amount conversion portion.

Figure 3:
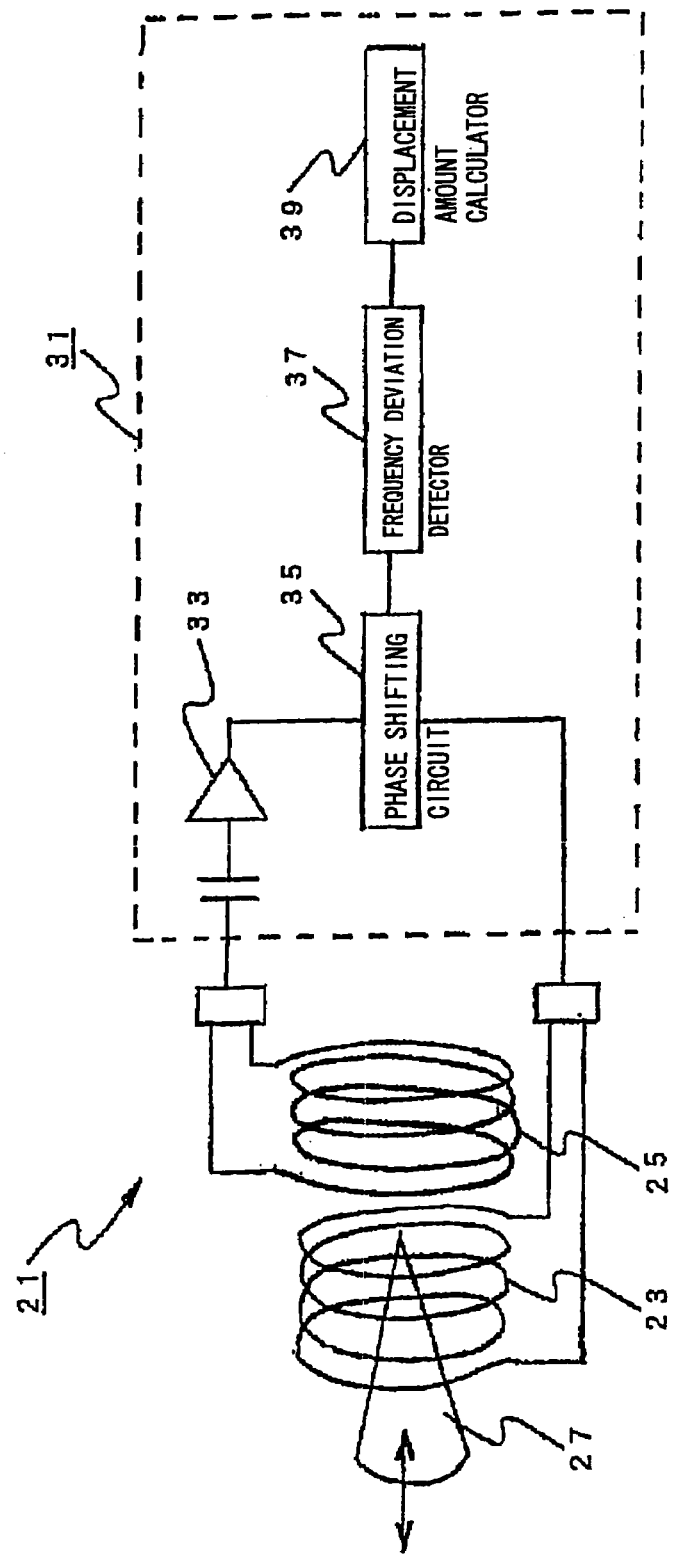
FIG. 3 is a block diagram of a displacement sensor of an inductance type according to a second embodiment of the invention.

FIG. 3 is a block diagram of a displacement sensor 21 of an inductance type according to a second embodiment. An excitation coil 23 and a detection coil 25 are arranged by aligning longitudinal axes of respective air core portions thereof commonly. Further, a probe 27 in a conical shape a sectional area of which is changed in a longitudinal direction is provided and the probe 27 is constituted by a magnetic body. Further, the probe 27 is arranged in a state of being inserted into the air core portion of the excitation coil 23. An output terminal from the detection coil 25 and an input terminal to the excitation coil 23 are connected to a signal processing portion 31. In the signal processing portion 31, the output terminal from the detection coil 25 is connected to an amplifier 33 and a phase shifting circuit 35 is provided between the amplifier 33 and the input terminal of the excitation coil 23. A frequency deviation detector 37 is connected to the phase shifting circuit 35, further, a displacement amount calculator 39 is connected to the frequency deviation detector 37.

In this way, by forming a single closed loop resonating circuit by including a space between the excitation coil 23 and the detection coil 25, that is, a magnetic circuit of the air core portion including the excitation coil 23—the probe 27—the detection coil 25, supplying energy from a power source, not illustrated, and pertinently setting a frequency-gain phase characteristic of the phase shifting circuit 35, resonance can be continued. An inner constitution of the phase shifting circuit 35 and operation thereof in such a closed loop resonating circuit is described in details in JP-A-9-145691.

In FIG. 3, when the probe 27 of the magnetic body is displaced and moved in the air core portion of the excitation coil 23, since the probe 27 of the magnetic body is formed in the conical shape, the volume of the magnetic body in the air core portion is changed. Thereby, as has been explained in reference to FIG. 2, the inductance of the excitation coil 23 is changed and there is brought about a change in the magnetic circuit of the space between the excitation coil 23 and the detection coil 25, that is, the magnetic circuit of the air core portion including the excitation coil 23—the probe 27—the detection coil 25. In accordance therewith, a phase difference is produced between an input signal inputted to the excitation coil 23 and an output signal outputted from the detection coil 25 and the phase shifting circuit 35 changes a frequency to nullify the phase difference. A frequency deviation at the occasion is detected by the frequency deviation detector 37 and the displacement amount is outputted by the displacement calculator 39 for processing a relationship between the frequency deviation and the displacement amount.

A frequency deviation equal to or larger than several 10 kHz is produced by a displacement amount of 1 mm and therefore, the displacement amount can be detected by a resolution at a micrometer level. Since the frequency deviation is in an order of several 10 kHz, a processing frequency of the signal processing portion is comparatively low and the signal processing portion can be constructed by a simple circuit constitution.

Figure 4:
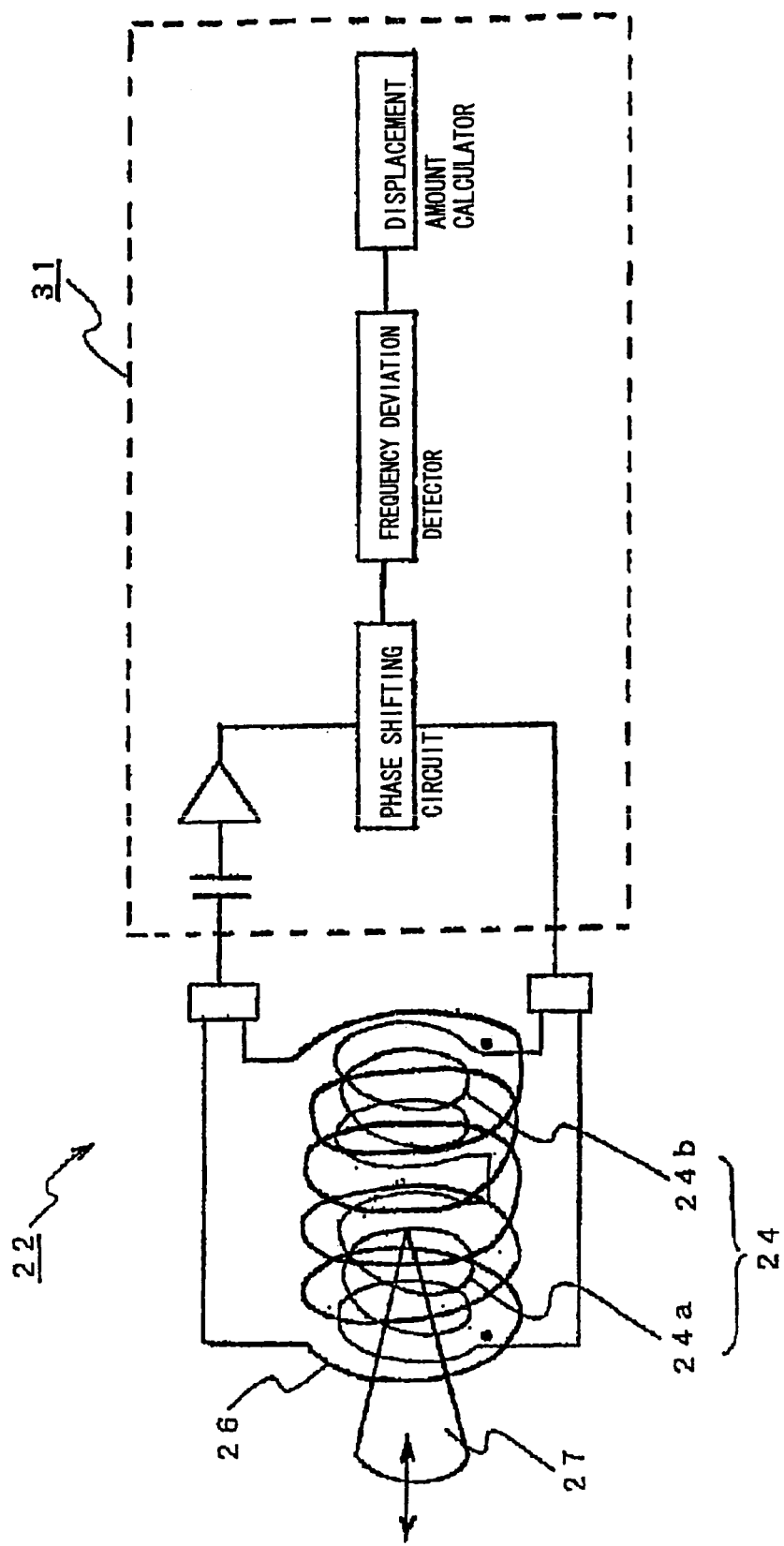
FIG. 4 is a block diagram of a displacement sensor of an inductance type having a higher sensitivity according to a third embodiment of the invention.

FIG. 4 shows a displacement sensor 22 of an inductance type having a higher sensitivity according to a third embodiment. The same notations are attached to constituent elements common to those of FIG. 3 and an explanation thereof will be omitted. In this case, there are used coils 24a and 24b wound such that pluralities thereof are directed reverse to each other and connected in series for an excitation coil 24. According to the constitution, magnetic fields are canceled by each other at a vicinity of a point of connecting the two coils 24a and 24b and when the two coils 24a and 24b are provided with the same characteristic, a substantially nullified magnetic field is constituted to balance. By constructing a constitution of arranging the probe 27 of the magnetic body to insert into the air core portion, a change in the balance by inserting the probe 27 of the magnetic body can be detected by a detection coil 26 and a sensitivity with respect to a displacement is further increased.

Since a frequency deviation equal to or larger than 10 kHz is produced by a displacement amount of 1 mm, there can be realized a displacement sensor for detecting and measuring a displacement amount of a moving object by a resolution at a micrometer level and suitable for small-sized and light-welded formation by a simple structure.

A positional relationship between the excitation coil and the detection coil may be established by an arranging method by which a constant positional relationship is fixed by arranging the excitation coil and the detection coil to align longitudinal axes of respective air core portions thereof commonly as in FIG. 3, arranging the detection coil concentrically at an outer periphery of the excitation coil as in FIG. 4 or the like. The probe may be arranged by being inserted into at least one of the air core portions of the excitation coil and the detection coil. Other than a conical shape, other shape by which a sectional area thereof is changed such as a portion of a cone, a function body of rotation constituting an axis of rotation by a longitudinal axis thereof, a portion of a pyramid or the like can be used for the probe.

In this way, there can be realized a displacement sensor for detecting and measuring a displacement amount of a moving object by a resolution of from micrometer to nanometer and suitable for small-sized and light-weighted formation by simple constitutions of the excitation coil, the detection coil and the probe and the signal processing portions having a comparatively low processing frequency.

Figure 5:
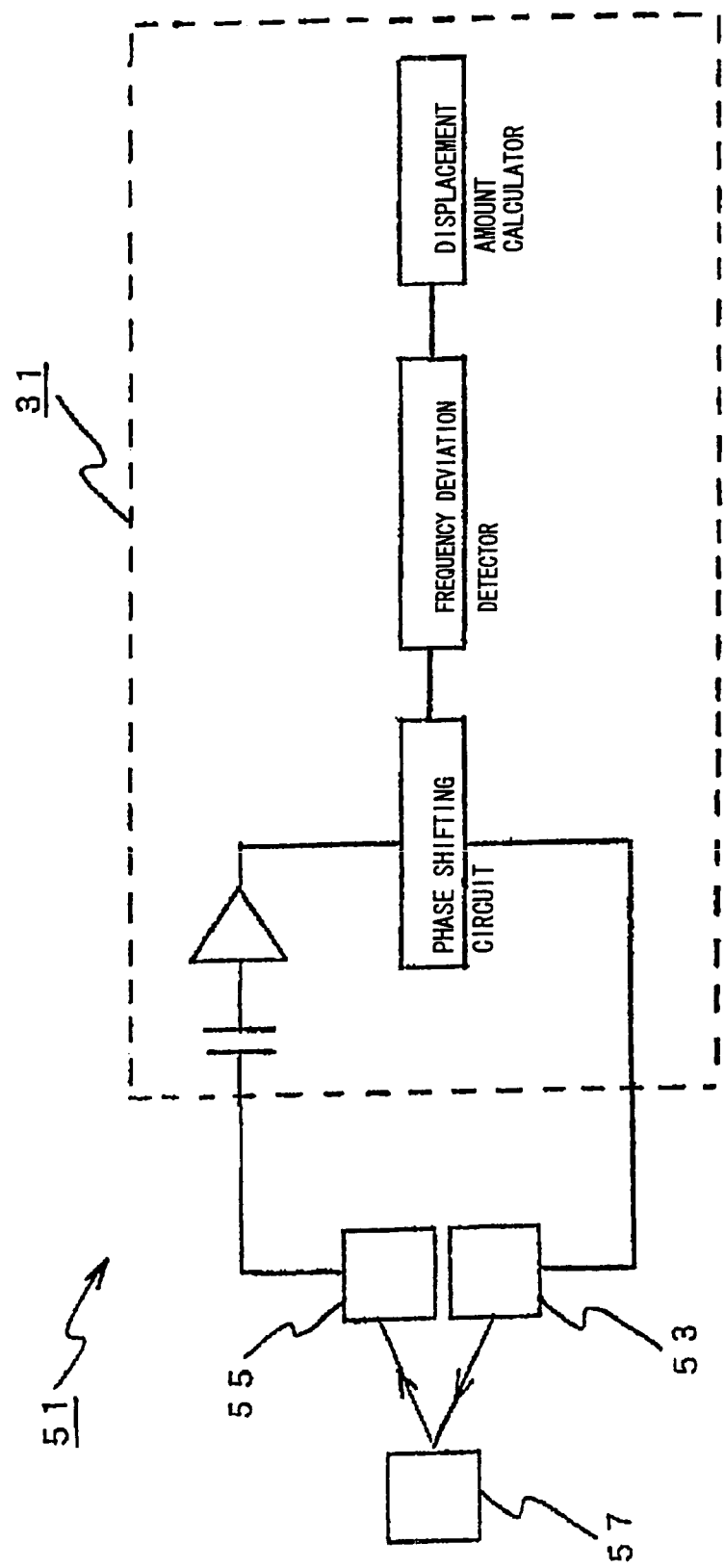
FIG. 5 is a block diagram of a displacement sensor of an optical type according to a fourth embodiment of the invention.

FIG. 5 is a block diagram of a displacement sensor 51 of an optical type according to a fourth embodiment. A light emitting element 53 and a light receiving element 55 are provided to be opposed to an object 57 to be measured. An output terminal from the light receiving element 55 and an input terminal to the light emitting element 53 are connected to the signal processing portion 31. Constitution and operation of the signal processing portion 31 are similar to those of FIG. 3 and therefore, an explanation thereof will be omitted. In this way, a single closed loop resonating circuit is formed by including a space between the light emitting element 53 and the light receiving element 55, that is, a path of light of the light emitting element 53—the object 57 to be measured—the light receiving element 55.

In FIG. 5, when the object 57 to be measured is displaced and a change is brought about at the space between the light emitting element 53 and the light receiving element 55, that is, in a length of the path of the light of the light emitting element 53—the object 57 to be measured—the light receiving element 55, in accordance therewith, a phase difference is produced between an input signal inputted to the light emitting element 53 and an output signal outputted from the light receiving element 55 and the phase shifting circuit 35 changes the frequency to nullify the phase difference. The frequency deviation at this occasion is detected by the frequency deviation detector 37 and the displacement amount is outputted by the displacement amount calculator 39 for processing a relationship between the frequency deviation and the displacement amount.

Since a frequency deviation equal to or larger than 100 kHz through 1000 kHz is produced by a displacement amount of 1 mm, the displacement amount can be detected by a resolution in a nanometer order. Since the frequency deviation is utilized, a processing frequency of the signal processing portion can be produced by a comparatively simple circuit constitution.

In this way, there can be realized a displacement sensor for detecting and measuring a displacement amount of a moving object by a resolution of from micrometer to nanometer and suitable for small-sized and light-weighted formation by simple constitutions of the light emitting element, the light receiving element and the signal processing portion having a comparatively low processing frequency.

INDUSTRIAL APPLICABILITY

The displacement sensor according to the invention can detect and measure the displacement amount of the moving object by the resolution of from micrometer to nanometer by a simple structure and is suitable for small-sized and light-weighted formation.

The invention claimed is:

1. A displacement sensor comprising:
an excitation coil and a detection coil arranged in a predetermined positional relationship;
an amplifier having an input end connected to an output end of the detection coil;
a phase shifting circuit provided between an output end of the amplifier and an input end of the excitation coil and configured to provide phase shifting to nullify a phase difference produced between an input waveform inputted to the excitation coil and an output waveform outputted from the detection coil by changing a frequency when the phase difference is produced between the input waveform inputted to the excitation coil and the output waveform outputted from the detection coil;
frequency measuring means for detecting a frequency deviation produced by the phase shifting circuit shifting the phase; and
a rod-like probe of a magnetic body which is inserted into at least one of air core portions of the excitation coil and the detection coil and a sectional area of which is changed in a longitudinal axis direction for detecting a displacement amount of an object to be measured from the frequency deviation produced by displacing the rod-like probe in the longitudinal axis direction while maintaining a resonating state of a closed loop including a space between the excitation coil and the detection coil.

2. The displacement sensor according to claim 1, wherein the excitation coil comprises two coils connected together in series and wound such that polarities thereof are directed reverse to each other.

* * * * *